United States Patent [19]

Weimer

[11] 3,867,645

[45] Feb. 18, 1975

[54] CIRCUIT FOR AMPLIFYING CHARGE

[75] Inventor: Paul Kessler Weimer, Princeton, N.J.

[73] Assignee: RCA Corporation, New York, N.Y.

[22] Filed: Aug. 31, 1973

[21] Appl. No.: 393,555

[30] Foreign Application Priority Data

Sept. 25, 1972 Great Britain .................... 44293/72

[52] U.S. Cl. ..... 307/221 D, 307/221 C, 307/224 C, 307/242, 357/24

[51] Int. Cl. .................... G11c 11/24, G11c 11/40, G11c 19/00, H01l 19/00

[58] Field of Search ........ 307/221 R, 221 C, 221 D, 307/224 R, 224 C, 225 R, 225 C, 246, 251, 242; 357/24; 328/37, 51, 67

[56] References Cited

UNITED STATES PATENTS

| | | | |
|---|---|---|---|
| 3,474,260 | 10/1969 | Frohbach | 307/221 R |
| 3,621,283 | 11/1971 | Teer et al. | 307/221 D X |
| 3,643,106 | 2/1972 | Berwin et al. | 307/221 D X |
| 3,746,883 | 7/1973 | Kovac | 307/221 C X |
| 3,764,824 | 10/1973 | Sangster | 307/221 C |

OTHER PUBLICATIONS

Buss et al., "Matched Filtering Using Tapped Bucket-Brigade Delay Lines," Electronics Letters (pub.), Vol. 8, No. 4, 2/24/1972; pp.106-107.

Sangster et al., "Bucket-Brigade Electronics-New Possibilities for Delay, Time-Axis Conversion and Scanning," IEEE Journal for Solid-State Circuits; Vol. 90-4, No. 3, 6/1969, pp.131-136.

Kovac et al., "Solid State Imaging Emerges from Charge Transport"; Electronics (pub.), 2/28/1972; pp.72-77.

Collins et al., "Charge-Coupled-Device Analogue Matched Filters," Electronics Letters (pub.), Vol. 8, No. 13, 6/29/1972; pp. 328-329.

*Primary Examiner*—Martin H. Edlow
*Assistant Examiner*—L. N. Anagnos
*Attorney, Agent, or Firm*—H. Christoffersen; Henry I. Schanzer

[57] ABSTRACT

A charge transfer circuit for amplifying relatively low signal levels. The circuit includes a charge transfer register for propagating a charge signal along the register. Amplifying means are coupled along the register for sensing and amplifying the charge signal. The outputs of the amplifying means are then summed to produce an output signal having a high signal-to-noise ratio.

11 Claims, 7 Drawing Figures

CIRCUIT FOR AMPLIFYING CHARGE

This invention is directed to charge transfer means for amplifying very low signal levels.

The amplification of low signal levels presents special problems because every amplifier introduces some noise into the signal it amplifies. Where the signal is very low, the amplifier noise may mask the signal. An amplifier may be represented schematically by an ideal "noiseless" amplifier having an equivalent noise source connected at its input. The noise source signal is amplified by the gain of the amplifier. Assuming the amplifier to have a gain "$A$", its output signal ($e_o$) is equal to $Ae_s + Ae_N$, where $e_s$ is the signal input and $e_N$ is the equivalent noise signal input. The signal-to-noise ratio (S/N) at the output of the amplifier is equal to $Ae_s/Ae_N = e_s/e_N$.

A known arrangement for improving the signal-to-noise ratio of an amplified signal includes the application of the same signal to a plurality of amplifiers connected in parallel. The signal-to-noise ratio (S/N) of the summed output signals of the amplifiers connected in parallel is equal to the sum of the signals divided by the square root of the sum of the squares of the noise signals. Assuming that the equivalent noise sources produce noise signals of equal amplitude the signal-to-noise ratio of amplifiers connected in parallel may be expressed as follows:

$$S/N = (n\ Ae_s)/\ \sqrt{n}\,Ae_N = \ \sqrt{n} \times (e_s/e_N) \qquad (1)$$

The signal-to-noise ratio is thus improved by the square root of the number of amplifiers connected in parallel. Qualitatively, the reason for the improvement in the signal-to-noise ratio is due to the fact that the signal is coherent whereas the noise signal is incoherent. That is, the signal portion at the output of one amplifier is in phase with that of another and is always additive. However, the noise signals are generated in a random fashion sometimes adding and sometimes subtracting.

However, connecting many amplifiers in parallel results in a significant increase in the input capacitance of the amplifying arrangement and/or in the loading of the signal by the combination. This tends to attenuate the signal resulting in the loss of any gain in signal-to-noise ratio obtained by connecting amplifiers in parallel. In circuits embodying the invention this disadvantage is eliminated and a marked improvement in signal-to-noise ratio is achieved.

Circuits embodying the invention include a charge transfer register for propagating charge signals. A plurality of amplifying means are spaced along said register for sensing the charge being propagated and for producing in response thereto a corresponding charge signal. Summing means are coupled to the outputs of said amplifying means for summing said output charge signals.

In the accompanying drawings, like reference characters denote like components; and FIG. 1 is a schematic diagram of a bucket brigade circuit embodying the invention;

Figure 1:
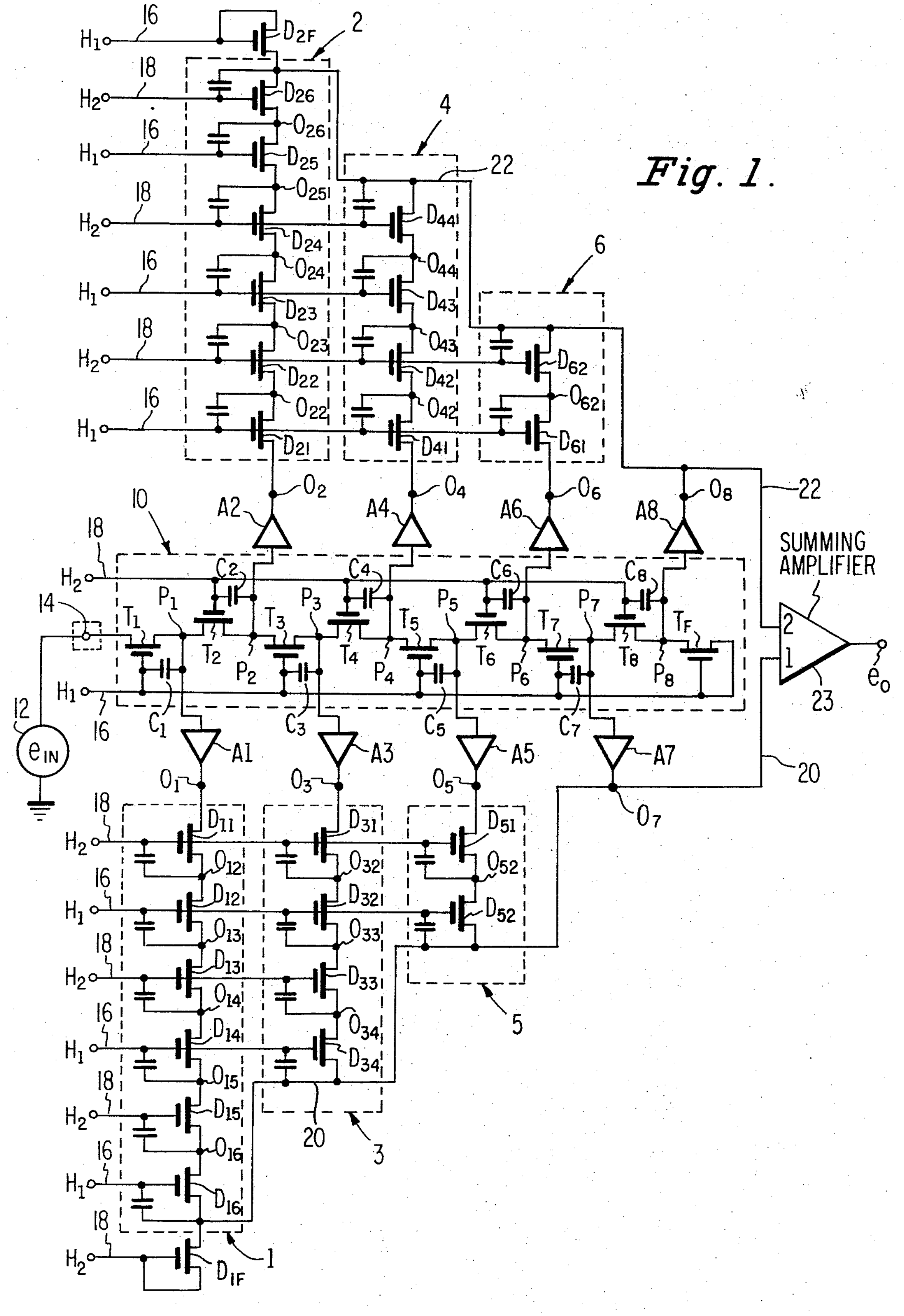

The circuit of FIG. 1 includes a charge transfer register 10 of the bucket brigade type having an input terminal 14 to which is connected a source 12 of input signals. The source 12 may be the output of a sensor or any source whose output is to be amplified. The register 10 includes transistors T1 through T8 having their sourcedrain paths connected in series between input terminal 14 and node P8. The gate electrodes of the odd numbered transistors (T1, T3, T5 and T7) are connected to conductor 16 to which is applied a clock signal denoted $H_1$. The gate electrodes of the even numbered transistors (T2, T4, T6 and T8) are connected to conductor 18 to which is applied a clock signal denoted $H_2$. Transistor $T_F$ is connected at its gate and drain electrodes to conductor 16 and at its source electrode to node P8. Transistor $T_F$ in response to an enabling $H_1$ pulse recharges node P8.

Figure 2:
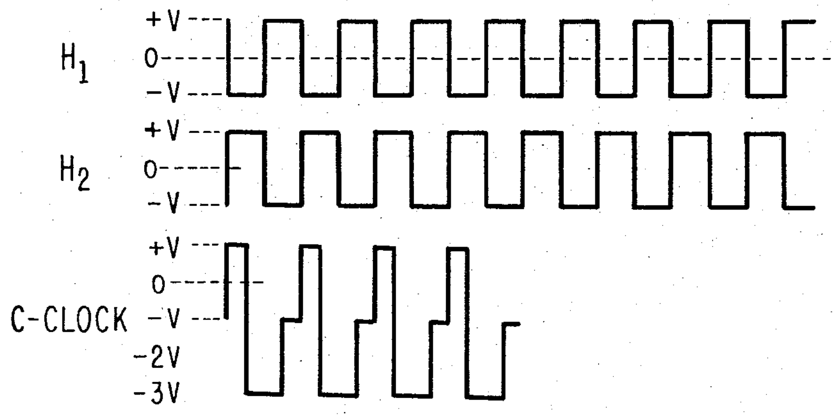
FIG. 2 is a waveform diagram of pulses applied to the circuits of FIGS. 1 and 3.

The clock signals $H_1$ and $H_2$ may be generated by any suitable clock generators (not shown) and, by way of example, may be complementary signals as shown in FIG. 2. The amplitude of $H_1$ and $H_2$ may vary between +V volts and −V volts where +V volts may be, for example, +3 volts and −V volts may be, for example −3 volts.

The drain of each one of transistors T1 through T8 comprises a node denoted by the letter P and a numeral denoting its position along the register. Connected to each node $P_i$ is an amplifier $A_i$ having an output terminal $O_i$ where $i$ may vary from 1 to 8 corresponding to the numberal of the P node.

The amplifiers A1 through A8 used to practice the invention may be any one of a number of well known amplifiers. Preferably, however, the amplifiers should be charge amplifiers of the type shown in FIG. 3. These amplifiers, detailed in my co-pending application entitled "Charge Amplifier" bearing Ser. No. 393,554, can amplify charge signals without the introduction of large noise components. That is, these charge amplifiers can be coupled to a charge transfer register without the need for an input resistor or a load resistor, thereby eliminating a major source of noise.

Figure 3A:
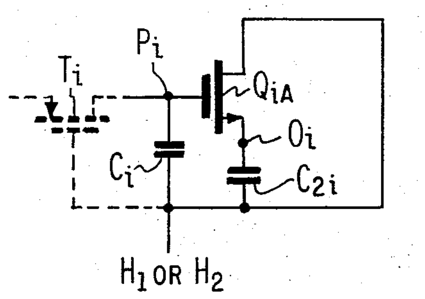
FIGS. 3A, 3B and 3C are schematic diagrams of charge amplifier circuits which may be used to practice the invention.

The amplifier of FIG. 3A includes a transistor $Q_{iA}$ of opposite conductivity type to that of the other transistors used in register 10. Transistor $Q_{iA}$ is connected at its gate electrode to node $P_i$ and has its source-drain path connected between the output terminal $O_i$ and a conductor to which is applied an $H_1$ or $H_2$ clock pulse. A capacitor $C_{2i}$ is connected between output terminal $O_i$ and the conductor to which the capacitor $C_i$ is connected. The transistor $Q_{iA}$ functions as a source follower and produces across capacitor $C_{2i}$ a charge signal proportional to the signal present at node $P_i$. By making $C_{2i}$ equal to or greater than $C_i$, charge amplification is achieved.

Figure 3B:
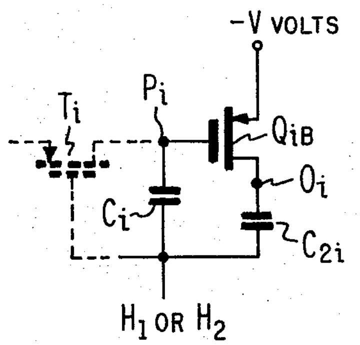

The amplifier of FIG. 3B includes a transistor $Q_{iB}$ of the same conductivity type as the transistors of register 10. Transistor $Q_{iB}$ is connected at its gate to a node $P_i$, at its source to −V volts, and at its drain to output node $O_i$. A capacitor $C_{2i}$ is connected between output terminal $O_i$ and the conductor to which the capacitor $C_i$ is connected. Transistor $Q_{iB}$ produces at $O_i$ an inverted and amplified version of the signal present at $P_i$.

Figure 3C:
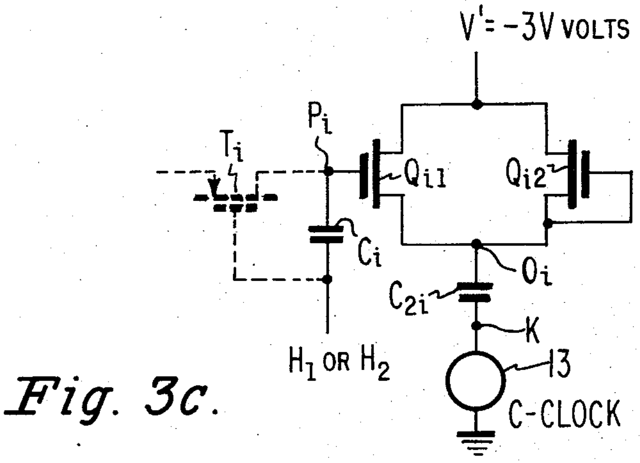

The amplifier of FIG. 3C functions as a source follower and includes two transistors ($Q_{i1}$, $Q_{i2}$) of the same conductivity type as the transistors of register 10. The two transistors $Q_{i1}$, $Q_{i2}$ have their source-drain paths connected in parallel between a point of fixed potential V' and an output terminal $O_i$. The gate of transistor $Q_{i1}$ is connected to node $P_i$ and the gate of transistor $Q_{i2}$ is connected to terminal $O_i$. A capacitor $C_{2i}$ is connected between output point $O_i$ and a terminal K to which is applied a source 13 of signal. The source 13 supplies a clock signal denoted the C-clock having a waveform of the type labelled C-clock shown in FIG. 2.

In the discussion to follow it will be assumed that in response to a charge signal, $e_s$, present at node $P_i$ each amplifier, $A_i$, produces an output charge signal $Ae_s$ at its output terminal $O_i$. The gain A may have a wide range of value being preferably greater than 1.

The output signals of the odd numbered amplifiers (A1, A3, A5 and A7) are summed on conductor 20 and the output signals of the even numbered amplifiers are summed on conductor 22. Outputs 01, 03, and 05 are coupled to conductor 20 by means of transfer registers 1, 3, and 5, respectively. Outputs 02, 04, and 06 are coupled to conductor 22 by means of transfer registers 2, 4, and 6, respectively. Outputs 07 and 08 are directly connected to conductors 20 and 22, respectively. Registers 1 through 6 function as delay paths to bring the odd and even numbered output signals produced at outputs $O_i$ into coincidence on conductors 20 and 22, respectively.

Conductors 20 and 22 are connected to inputs 1 and 2, respectively, of summing amplifier 23. Amplifier 23 may be any one of a known group of amplifiers which in rsponse to input signals (i.e. the signals on conductors 20 and 22) is adapted to produce an output signal, $e_o$, which is the combination or sum of its two input signals. During one half of each cycle, (i.e. when $H_1$ goes to −V volts) signals are supplied to conductor 20 and during the other half of each cycle, (i.e. when $H_2$ goes to −V volts) signals are supplied to conductor 22.

Each one of registers 1 and 2 includes six transistors, (D11 through D16 and D21 through D26, respectively) having their source-drain paths connected in series. Each one of registers 3 and 4 includes four transistors, (D31 through D34 and D41 through D44, respectively) having their source-drain paths connected in series. Each one of registers 5 and 6 includes two transistors, (D51, D52 and D61, D62, respectively) having their source-drain paths connected in series.

The gate electrodes of the odd numbered transistors of registers 1, 3 and 5 and the gate electrodes of the even numbered transistors of registers 2, 4 and 6 are connected to conductors numbered 18 to which are applied the clock signal $H_2$. The gate electrodes of the even numbered transistors of registers 1, 3 and 5 and the gate electrodes of the odd numbered transistors of registers 2, 4, and 6 are connected to conductors numbered 16 to which are applied the clock signal $H_1$.

Transistor $D_{1F}$ connected at its source to conductor 20 and at its gate and drain to conductor 18 recharges conductor 20 when enabled by an $H_2$ clock pulse. Transistor $D_{2F}$ connected at its source electrode to conductor 22 and at its gate and drain to conductor 16 recharges conductor 22 when enabled by an $H_1$ pulse.

In the discussion to follow it will be assumed, for ease of explanation, that the transistors in registers 1 through 6 and 10 are P-conductivity type field-effect transistors. Each one of these transistors has a capacitor connected between its gate and drain electrodes ($C_{DG}$). So connected, these transistors when enabled transfer charge from their source to their drain, and are generically referred to, in this application, as charge transfer devices. A pulse applied to the gate electrode of a charge transfer device in a direction to turn on the device is termed an enabling pulse. For clock pulses $H_1$ and $H_2$ of the type shown in FIG. 2, a P-conductivity device is turned on when the pulse applied to its gate goes from +V volts to −V volts. The negative going pulse transition of −2V volts amplitude is coupled through the gate-to-drain capacitance establishing a potential of −3V volts at the drain. A charge signal ($e_s$) at the source of the device, whose potential level is above −V volts, is transferred from the source to the drain of the device causing the potential at the drain to rise to ($-3V + e_s$) volts. When the pulse applied to the gate of the device returns from −V volts to +V volts the device is turned off. But, the positive clock pulse transition of 2V volts amplitude is coupled through the gate-to-drain capacitance raising the potential at the drain to ($-V + e_s$) volts. The signal is then ready for transfer through a succeeding charge transfer device.

The operation of the circuit of FIG. 1 may best be illustrated by showing how an input signal present at terminal 14 is propagated along register 10 and how the signal is concurrently amplified and eventually summed. A first $H_1$ pulse transfers an input signal $e_s$ from terminal 14 to node $P_1$. The signal $e_s$ present at $P_1$ is concurrently amplified by amplifier $A_1$ and an output signal $Ae_s$ is produced at terminal $O_1$. A first $H_2$ pulse following the first $H_1$ pulse enables the transfer of $e_s$ from node $P_1$ to node $P_2$. Amplifier $A_2$ concurrently produces a signal $Ae_s$ at output $O_2$. The first $H_2$ pulse also enables transistor D11 of register 1 transferring the signal $Ae_s$ from node $O_1$ to node $O_{12}$. A second $H_1$ pulse causes the transfer of $e_s$ from node $P_2$ to node $P_3$ and amplifier $A_3$ concurrently provides a signal $Ae_s$ at node $O_3$. Concurrently, the second $H_1$ pulse causes the transfer of a signal $Ae_s$ from node $O_2$ to node $O_{22}$ and of a signal $Ae_s$ from node $O_{12}$ to node $O_{13}$. A second $H_2$ pulse enables transistor $T_4$ causing the transfer of the signal $e_s$ from node $P_3$ to node $P_4$ and amplifier $A_4$ produces a signal $Ae_s$ at node $O_4$. Concurrently, the signals $Ae_s$ at nodes $O_{13}$, $O_{22}$, and $O_3$ are advanced, respectively to nodes $O_{14}$, $O_{23}$, and $O_{32}$.

A third $H_1$ pulse enables transistor $T_5$ causing the transfer of the signal $e_s$ from node $P_4$ to node $P_5$ and amplifier $A_5$ produces a signal $Ae_s$ at node $O_5$. Concurrently, the signals $Ae_s$ present at nodes $O_{14}$, $O_{23}$, $O_{32}$, and $O_4$ are transferred, respectively to nodes $O_{15}$, $O_{24}$, $O_{33}$, and $O_{42}$.

A third $H_2$ clock pulse enables transistor $T_6$ causing the transfer of the signal $e_s$ from node $P_5$ to node $P_6$ and amplifier $A_6$ produces a signal $Ae_s$ at node $O_6$. Concurrently, the signals $Ae_s$ present at nodes $O_{15}$, $O_{24}$, $O_{33}$, $O_{42}$ and $O_5$ are transferred, respectively, to nodes $O_{16}$, $O_{25}$, $O_{34}$, $O_{43}$ and $O_{52}$.

A fourth $H_1$ pulse enables transistors $T_7$ causing the transfer of the signal $e_s$ from node $P_6$ to node $P_7$ and amplifier $A_7$ produces signal $Ae_s$ at node $O_7$ which is common to conductor 20. Concurrently, the signals $Ae_s$ present at nodes $O_{16}$, $O_{34}$, and $O_{52}$ are transferred to conductor 20 and conductor 20 is charged an amount equal to $4 \times Ae_s$. The capacitance connected between conductor 20 and conductor 16 serves to store this charge. The charge signal of $4 \times Ae_s$ is applied to input 1 of summing amplifier 23 which produces an output signal $e_o$ in response thereto. Concurrently, the signals $Ae_s$ present at nodes $O_{25}$, $O_{43}$, and $O_6$ are transferred, respectively, to nodes $O_{26}$, $O_{44}$, and $O_{62}$.

A fourth $H_2$ clock pulse enables transistor $T_8$ causing the transfer of the signal $e_s$ from node $P_7$ to node $P_8$ and the production of a signal $Ae_s$ at node $O_8$ which is common to conductor 22. The $H_2$ clock pulse concurrently enables the transfer of the signal $Ae_s$ from nodes $O_{26}$, $O_{44}$, and $O_{62}$ to conductor 22. These signals charge-up the conductor capacitance in an amount equal to $4 \times Ae_s$. The summed signal is applied to input 2 of amplifier 23. In response to the signal on conductor 22 amplifier 23 produces an output which is combined with the output it produced half a cycle earlier in response to the signal on conductor 20. The fourth $H_2$ clock pulse also enables transistor $D_{1F}$ recharging conductor 20 to −V volts.

In the charge transfer registers used to practice the invention a packet of charge denoted as $e_s$ or $Ae_s$ is transferred from node-to-node along a register. The charge transfer registers are capable of transferring very small analog signals, with negligible increase in noise level, from one stage to the next stage. Therefore, substantially the same unadulterated signal is applied to amplifiers A1 through A8 along register 10 and substantially the same $Ae_s$ signals are transferred from stage-to-stage along registers 1 through 6.

It should be appreciated that amplifiers A1 through A8 constitute an amplifier stage whose effective transconductance is increased by one or more orders of magnitude without increasing the input capacitance. This is accomplished by applying substantially the same charge packet successively to each amplifier input to control the current flow in each of the 8 amplifiers. The total output signal is obtained by delaying each of the amplified output signals by different amounts to bring the outputs into coincidence in time and then adding them. The total transconductance of "$n$" amplifiers is "$n$" times that of a single amplifier while the effective input capacitance for each charge packet (signal) is the same as for one amplifier since each amplifier input is used in sequence. The total output signal of the amplifier stage is increased by $n$ times that of a single stage and the signal-to-amplifier-noise ratio is increased by $\sqrt{n}$. If $n$ were 100, the effective signal-to-noise ratio of the combination would be increased by 10. Thus, the combination of the charge transfer registers and the charge amplifiers enable the signal-to-noise ratio of the output signal to be greatly improved and to approach the theoretical value set forth in equation 1.

Note that the gain of the amplifiers $A_i$ may vary from one to another. This, however, does not produce any non-uniformity since all the output signals are eventually combined. It should also be appreciated that the multiinput amplifiers with their delaying registers can be easily integrated onto a single silicon chip. This permits the use of a very large number of amplifying transistors in sequence.

Figure 4:
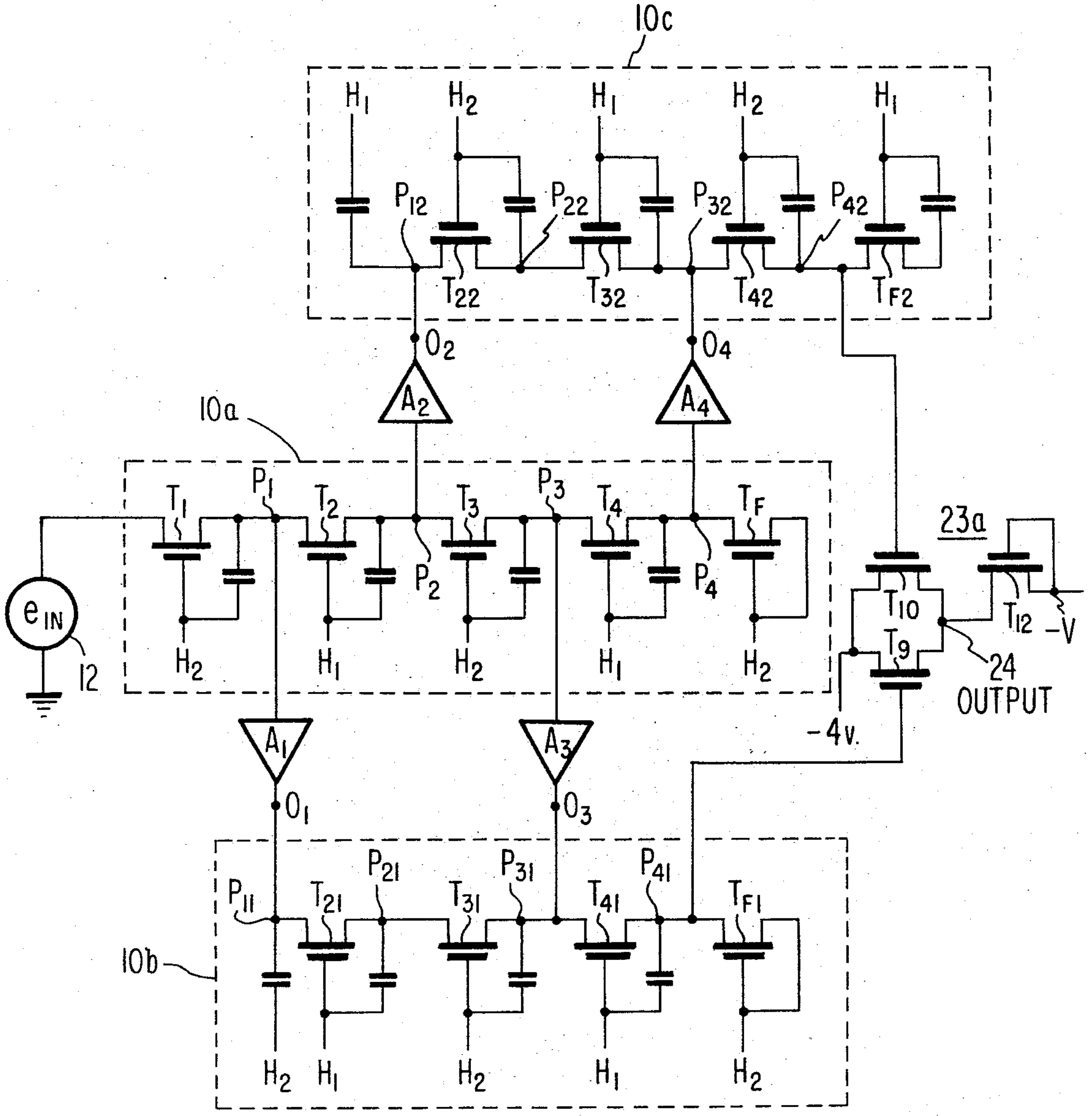
FIG. 4 is a schematic diagram of another bucket brigade type circuit embodying the invention.

The circuit of FIG. 4 illustrates an alternative method of bringing into coincidence the signals produced at the output of the amplifiers. Register **10*a* of FIG. 4, only four stages of which are shown, corresponds to register 10 of FIG. 1. Each stage, as before, has a node (P1 through P4) connected to the input of an amplifier (A1 through A4). The outputs of the odd numbered amplifiers are summed by means of a register 10*b* and the outputs of the even numbered amplifiers are summed by means of a register 10*c*. The outputs (nodes P41 and P42) of registers 10*b* and 10*c* are applied to an amplifier 23*a* comprised of transistor T9, T10, and T12. Amplifier 23*a* produces an output at terminal 24 which is the combination or sum of its two input signals. As in the circuit of FIG. 1** clock pulses $H_1$ and $H_2$ are used to transfer the signal information from stage-to-stage.

In the operation of this circuit a source of input signals 12 is connected to the source of transistor T1. A first $H_2$ clock pulse enables transistor T1 causing the transfer of a signal $e_s$ to node P1. The signal at P1 is amplified by amplifier A1 producing a signal $Ae_s$ at node P11. A first $H_1$ pulse causes the transfer of the signal $e_s$ from node P1 to node p2 and in response to the signal at P2 amplifier A2 produces a signal $Ae_s$ at node P12. Concurrently, the signal $Ae_s$ is transferred from node P11 to node P21.

A second $H_2$ pulse causes the transfer of signal $e_s$ from node P2 to node P3 and amplifier A3 produces a signal $Ae_s$ at node P31. Concurrently, transistor T31 is enabled and a signal $Ae_s$ is transferred from node $P_{21}$ to node P31. Node P31 thus acts as a summary point of the signals $Ae_s$ from amplifiers A1 and A3. Accordingly, the signal present at node P31 is equal to $2 \times Ae_s$. Concurrently, a signal $Ae_s$ is transferred from node P12 to node P22.

A second $H_1$ pulse causes the transfer of the signal $e_s$ from node P3 to node P4 and the production of a signal $Ae_s$ at node P32. Transistor T32 is also enabled and transfers a signal $Ae_s$ from node P22 to node P32. Accordingly, there is produced at node P32 a signal whose magnitude is $2 \times Ae_s$. That is, node P32 acts as a summing point of the output signal of amplifier A2 being propagated along T22 and T32 and of the output signal produced by amplifier A4.

The second $H_1$ pulse also enables transistor T41 causing the transfer of the signal of amplitude $2 \times Ae_s$ from node P31 to node P41. The signal at P41 is applied to the gate of transistor T9. Transistor T9 in response to charge signal applied to its gate produces an output signal at terminal 24.

The third $H_2$ pulse transfers a signal of magnitude $2 \times Ae_s$ from node P32 to node P42. Node 42 is connected to the gate of transistor T10 which functions like transistor T9 to produce an output at terminal 24. The outputs of the even and odd numbered amplifiers are thus combined at output 24 during successive half cycles to produce a single summed output.

Transistors T9, T10 and T12 connected as shown function as an inverting amplifier. But, by changing the value of the bias voltages and the gate connection of transistor T12 the amplifier **23*a*** operates in the source follower mode.

In the circuit of FIG. 4 signal summing is done an alternate nodes of the two registers (**10*b* and 10*c***) fed by the outputs of the amplifiers. Note that in this circuit as well as in the other embodiments each summed signal undergoes the same number of transfers.

Figure 5:
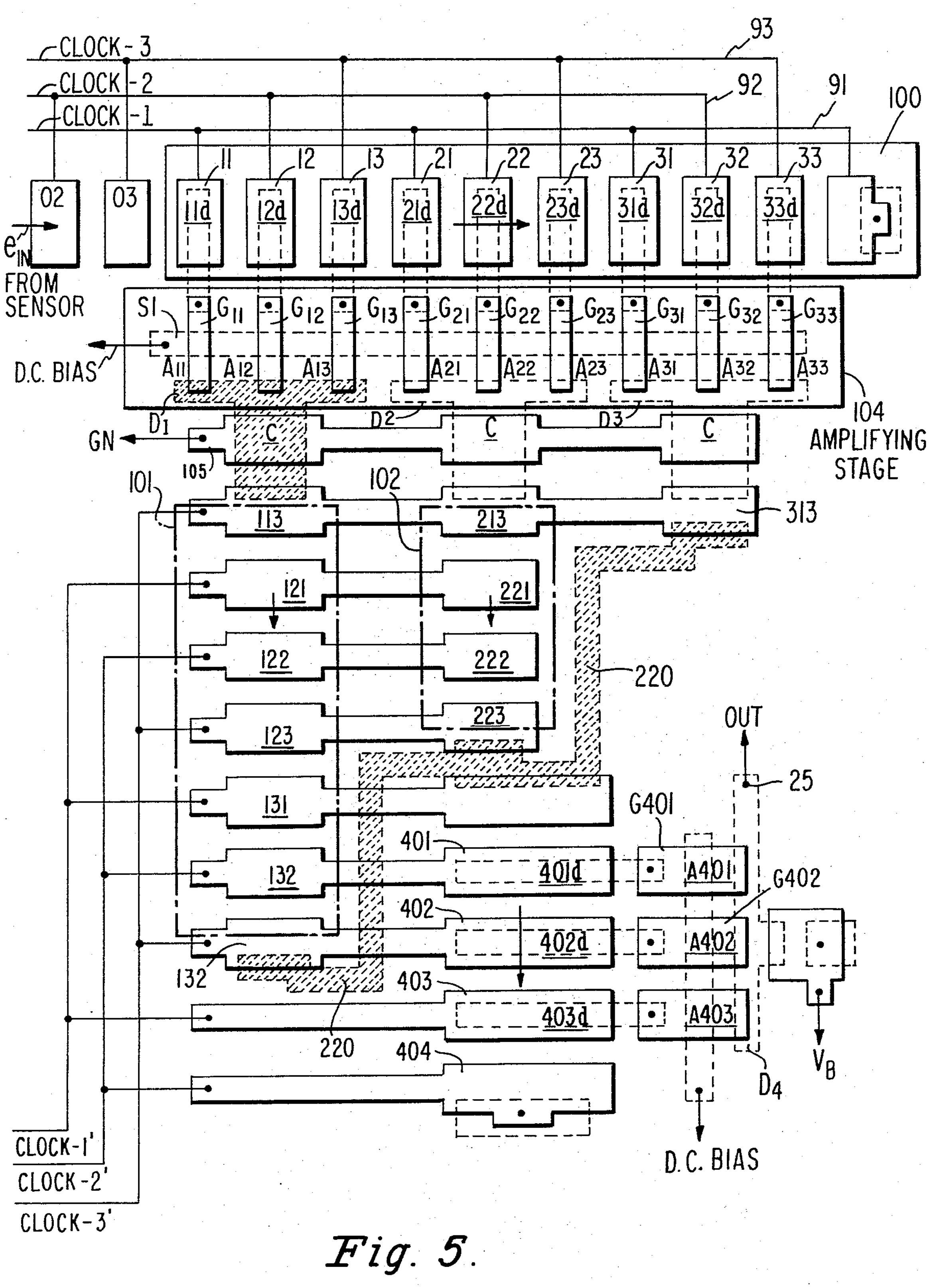
FIG. 5 is a drawing of a charge coupled circuit embodying the invention.

FIG. 5 illustrates the use of charge coupled devices (CCD) to practice the invention. FIG. 5 is a top view of the circuit. The metallization pattern and metal conductors are indicated by solid lines and the diffused regions are indicated by dotted lines.

A three-phase charge-coupled transfer register 100 sequentially applies signals to the amplifiers (A11 through A33) of amplifier stage 104. Charge-coupled delaying registers 101 and 102 couple two output regions (D1, D2) of the amplifier stage to diffused region 220 and the third output region (D3) of the amplifier stage is directly coupled to the region 220.

Input signals from a sensor (not shown) are transferred, by the application of clock signals to electrodes $O_2$ and $O_3$, to register 100. Registers 100, 101 and 102 include a repetitive pattern of metal electrodes arranged in groups of three. Those electrodes whose last numeral is the number 1 are coupled to a conductor to which is applied clock-1 or clock-1'. Those electrodes whose last numeral is the number 2 are coupled to a conductor to which is applied clock-2 or clock-2'. Those electrodes whose last numeral is the number 3 are coupled to a conductor to which is applied clock-3 or clock-3'. The primed clock signals have the same frequency and phase as the unprimed signals but may have a different d.c. bias. Underneath at least a portion of each (control) electrode of register 100 is a diffused region which is like numbered with the letter *d* appended to the numeral.

Each of the diffused regions (except the last) of register 100 is connected to the gate electrode of a like numbered amplifying transistor ($A_{ij}$). Each amplifying transistor includes a gate electrode whose applied potential controls the flow of current (holes for an N-type substrate) from a source region $S_1$ (common to all the transistors) to its drain region. The amplifying transistors are arranged in groups of three; every three amplifying transistors having the same first numeral have a common drain region denoted by the letter D and a numeral corresponding to said first numeral.

The diffused drain regions D1, D2 and D3 extend below a control electrode 105 whose use is optional. Conductor 105 is designed to increase the drain region capacitance in order to enable the storage of more charge signal and also senses to shield the amplifier stage from the swings of clock-3'.

In the operation of the circuit of a first clock-1 pulse causes the transfer of a charge signal to region 11*d*. This signal is applied to the gate G11 of transistor amplifier A11 causing a signal $Ae_s$ to be produced in diffused region D1. A first clock-2 pulse causes the transfer of the signal $e_s$ from region 11*d* to region 12*d*. The signal present in region 12*d* is applied to gate G12 and amplifier A12 produces a signal $Ae_s$ in region D1. A first clock-3 pulse causes the transfer of the charge signal $e_s$ from region 12*d* to region 13*d*. The signal present in region 13*d* is applied to gate G13 and amplified by amplifying transistor A13 to produce a signal $Ae_s$ in region D1. The signals generated by amplifying transistors A11, A12 and A13 are additive causing a charge signal within region D1 having a value equal to $3 \times Ae_s$. The first clock-3 pulse also causes the transfer of the charge signal $3 \times Ae_s$ to a region underneath electrode 113.

A second group of clock-1, clock-2 and clock-3 pulses causes the transfer of signals $e_s$ along regions 21*d*, 22*d* and 23*d* of register 100 and the production of a charge signal of magnitude $3 \times Ae_s$ in region D2. Concurrently, the charge signals $3 \times Ae_s$ are transferred underneath electrodes 121, 122 and 123 of register 101.

A third group of clock-1, clock-2 and clock-3 pulses causes the transfer of the signal $e_s$ along regions 31*d*, 32*d* and 33*d* of register 100 and the production of a charge signal of $3 \times Ae_s$ in region D3. Concurrently, these clock pulses cause the charge signals to be transferred underneath electrodes 131, 132, and 133 of register 101 and underneath electrodes 221, 222 and 223 of register 102. On the clock-3 pulse of said third group all the amplified charge signals are transferred to diffused regions 220 which accumulates a charge of $3 \times 3\ Ae_s$ magnitude. If the amplifiers A11–A33 employ the same type carriers as register 100, the amplified signals will produce an inversion of the charge signal passing from the source S1 to the different regions 220. To avoid signal inversion the amplifiers and the registers 101 and 102 should transfer carriers of opposite sign to those in register 100 which would require that register 100 be of complementary conductivity to that of the amplifiers.

The charge accumulated in region 220 is then transferred along regions 401*d*, 402*d*, 403*d* and amplified by amplifying transistors A401, A402 and A403 which are similar in configuration and operation to the amplifying transistor in stage 104.

Amplifying transistors A401, A402 and A403 have a common drain region D4 in which an amplified and summed charge signal is produced. Drain region, D4, is connected to output terminal 25 at which is produced a signal having a high signal-to-noise ratio.

Registers 100, 101 and 102 are of the charge-coupled type but it should be evident that one or more of these registers could be of the bucket-brigade type, i.e., of the type shown in FIGS. 1 and 4. The charge-coupled devices and bucket-brigade type devices can be fabricated compatibly on the same chip, and charges can be transferred easily, from a circuit of one type to that of the other.

The summing arrangement shown in FIGS. 1, 3 and 5 may be simplified by operating the output registers (10, 10*a*, 100) at a higher rate than the frequency of the input signal. For example, in FIG. 1, the signal $e_{in}$ having a rate of $f_1$ would be clocked along the register 10 by $H_1$ and $H_2$ (for the 8 stage embodiment shown) having a clock rate of at least four times $f_1$. The input signal would have to be gated to allow only one sample per 4 cycles of $H_1$ and $H_2$. But, the summing network could be simplified to include one transfer device connected between each amplifier output and a common output line.

The multiple-input amplifying arrangement described herein represents an approach which offers superior noise performance to existing amplifier designs. There are many applications for these amplifiers. For example, they are useful in conjunction with solid state imaging devices; they could also be used to improve the low light level performance of a beam-scanned camera tube such as the Plumbicon or silicon vidicon. Such integrated amplifiers could be located within the tube or on the outside in close proximity to the signal plate lead. Evidently, they could be used to amplify the output of any suitable sensor.

What is claimed is:

1. The combination comprising:

a charge transfer register having a plurality of stages, said register adapted to receive a charge signal and including means for transferring said signal from stage-to-stage along said register;

a multiplicity of amplifying means spaced along said register; each amplifying means having an input coupled to a different one of said stages of said register for sensing said charge signal and having an output point for producing thereat an output signal in response to said charge signal;

a common output point; and means for summing the charge signals produced at the output points of said amplifying means, including charge transfer means coupled between said output points of said amplifying means and said common output point.

2. The combination as claimed in claim 1 wherein said charge transfer register is of the bucket brigade type.

3. The combination as claimed in claim 1 wherein said charge transfer register is of the charge coupled type.

4. The combination as claimed in claim 1 wherein each one of said amplifying means is a charge amplifier which in response to a given charge signal at its input produces an increased charge signal at its output.

5. The combination as claimed in claim 1 wherein said charge transfer means of said summing means are of the bucket-brigade type.

6. The combination as claimed in claim 1 wherein said charge transfer means of said summing means are of the charge-coupled type.

7. The combination as claimed in claim 1 wherein said charge transfer means of said summing means provide different delays between said output points of said amplifying means and said common point for bringing the output signals produced at said output points into coincidence at said common point.

8. The combination as claimed in claim 1 wherein said summing means includes at least one common conductor element;

wherein said charge transfer means of said summing means includes charge transfer registers connected between the outputs points of selected ones of said amplifying means and said conductor element, wherein said transfer registers of said summing means are of varying lengths to provide different delays between the selected output points and the conductor element for bringing the output signals produced at said output points into time coincidence at the conductor element; and wherein said summing means includes means coupling said conductor element to said common output point.

9. The combination as claimed in claim 1 wherein said summing means includes two conductors;

wherein said charge transfer means of said summing means includes charge transfer registers connected between the output points of selected ones of every other one of said amplifying means and one of said two conductors and charge transfer registers connected between the output points of selected ones of the remaining amplifying means and the other one of said two conductors;

wherein said charge transfer registers of said summing means are of varying lengths to provide different delays between the selected output points and their respective conductors for bringing the output signals produced at said output points into time coincidence at their respective conductors; and a summing amplifier coupled between said two conductors and said common point for combining the output signals of said two conductors at said common output point.

10. The combination comprising:

an input point for the application thereto of input signals; and an output point for the production thereat of amplified signals;

an input charge transfer register having an input terminal connected to said input point and a plurality of output nodes;

means coupled to said input register for transferring charge signals corresponding to said input signals from output node to output node along said input register;

a plurality of charge amplifiers, each amplifier having an input terminal connected to a different one of said output nodes and an output terminal; and charge transfer summing means connected between each one of said output terminals of said amplifiers and said output point for delaying the signals produced at said output terminals by different amounts to bring them into time coincidence at said output point.

11. The combination as claimed in claim 10 wherein said charge transfer summing means includes a transfer register having a multiplicity of input nodes and an output node; and means for connecting different ones of said output terminals of said amplifying means to different ones of said input nodes of said summing register; and means coupling the output node of said summing register to said output point.

* * * * *

UNITED STATES PATENT OFFICE

CERTIFICATE OF CORRECTION

PATENT NO. 3,867,645

DATED February 18, 1975

INVENTOR(S) Paul Kessler Weimer

It is certified that error appears in the above-identified patent and that said Letters Patent are hereby corrected as shown below.

Column 2, line 11 "sourcedrain" should be ---source-drain--- line 51 "$Q_i$ " should be ---$O_i$---

Column 3 line 35 "rsponse" should be ---response---.

Column 5 line 58 "multiinput" should be ---multi-input---

Column 6 line 17 "p2" should be ---P2--- line 24 "$P_{21}$" should be ---P21)

line 58 "an" should be ---at---.

Signed and Sealed this

*fifth* Day of *August 1975*

[SEAL]

*Attest:*

RUTH C. MASON
*Attesting Officer*

C. MARSHALL DANN
*Commissioner of Patents and Trademarks*

Notice of Adverse Decision in Interference

In Interference No. 99,007 involving Patent No. 3,867,645, P. K. Weimer, CIRCUIT FOR AMPLIFYING CHARGE, final judgment adverse to the patentee was rendered Apr. 6, 1976, as to claims 1, 3, 4, 6, 7, 10 and 11.

[*Official Gazette June 22, 1976.*]